United States Patent [19]
Gennari et al.

[11] Patent Number: 5,813,515
[45] Date of Patent: Sep. 29, 1998

[54] SORTING MACHINE WITH ALWAYS TILTED TRANSPORTATION PLANES

[75] Inventors: Nedo Gennari; Andrea Faure, both of Genoa, Italy

[73] Assignee: Finmeccanica S.p.A., Rome, Italy

[21] Appl. No.: 653,452

[22] Filed: May 24, 1996

[30] Foreign Application Priority Data

Jul. 4, 1995 [IT] Italy ................................. MI95A1427

[51] Int. Cl.[6] .................................................. B65G 47/46
[52] U.S. Cl. .................. 198/370.05; 198/370.06
[58] Field of Search ........................ 198/370.05, 370.06

[56] References Cited

U.S. PATENT DOCUMENTS

| | | | |
|---|---|---|---|
| 3,550,748 | 12/1970 | Hauer | 198/370.06 |
| 3,550,751 | 12/1970 | Jack, Jr. | 198/370.05 |
| 4,565,277 | 1/1986 | Benier | 198/370.05 |
| 4,781,281 | 11/1988 | Canziani | 198/370.06 |
| 4,805,780 | 2/1989 | Sølund | 198/370.05 |
| 4,972,934 | 11/1990 | Lassiter, Jr. et al. | 198/370.05 |
| 5,181,596 | 1/1993 | Warkentin | 198/370.05 |
| 5,190,135 | 3/1993 | Sølund | 198/370.05 |
| 5,477,955 | 12/1995 | Madden et al. | 198/370.05 |

*Primary Examiner*—Karen B. Merritt
*Assistant Examiner*—Douglas Hess
*Attorney, Agent, or Firm*—Notaro & Michalos PC

[57] ABSTRACT

A sorting machine comprising a plurality of dollies each provided with a rotating mat forming a transportation and discharging plane for objects, whereby the dollies are are kept in a tilted position during the displacement along their transportation path, wherein each dolly is provided with a pair of idle wheels which run along a guide that is shaped to form two superposed guides, the front and rear rolls of the dolly respectively rolling along these paths so as to maintain the dolly in an inclined position. To perform the discharging operation a rack is provided, mounted on a movable support, which is displaced until it engages a toothed wheel mounted on the shaft of one of the support rolls of the rotating mat.

7 Claims, 4 Drawing Sheets

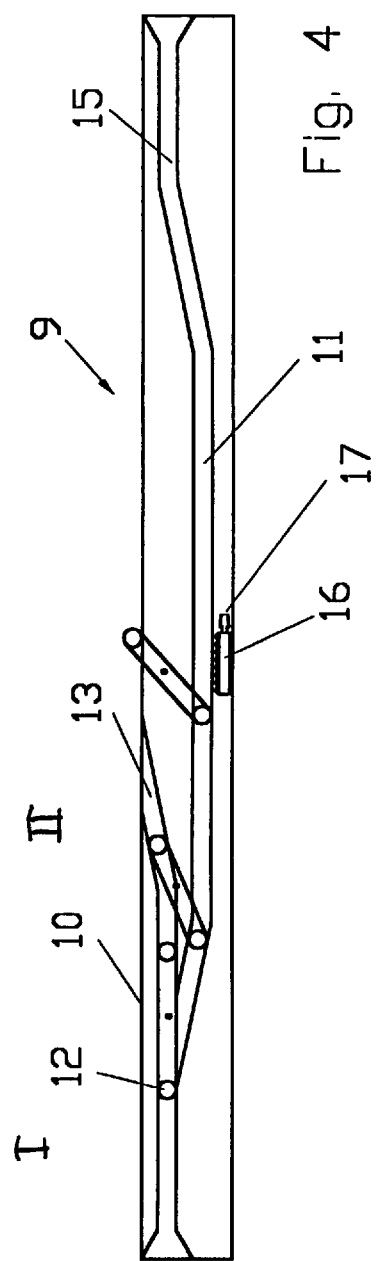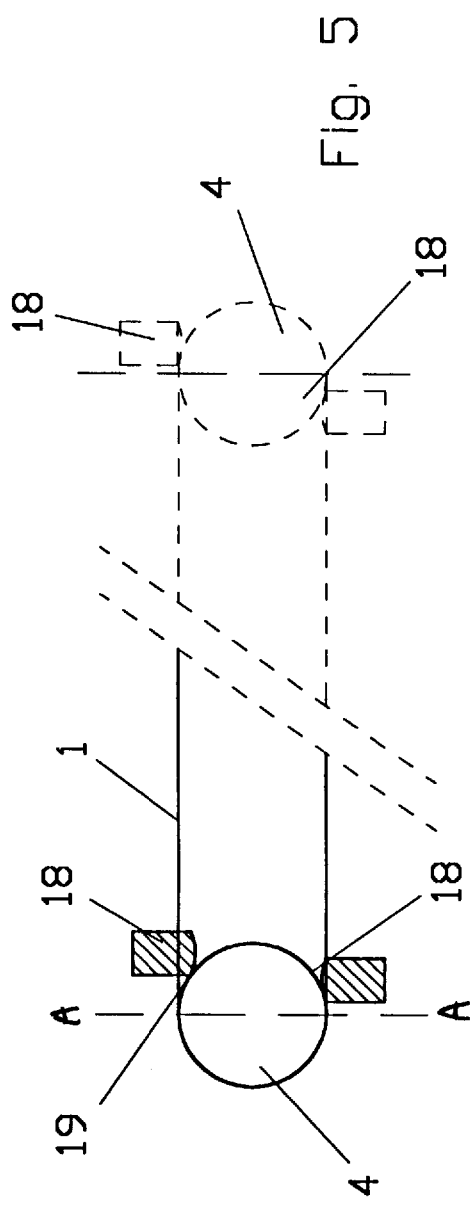

5,813,515

SORTING MACHINE WITH ALWAYS TILTED TRANSPORTATION PLANES

FIELD AND BACKGROUND OF THE INVENTION

The present invention proposes a sorting machine of the type comprising a plurality of dollies each provided with a rotating mat forming a transportation and discharging plane for the objects, in which said dollies move keeping the tilted position.

Each dolly is provided with a pair of idle wheels which are arranged on the same side of the dolly and glide within superposed rails so as to keep said wheels at different heights, thereby tilting the dolly.

On the shaft of at least one of the support rollers for the rotating mat a gear wheel is mounted that at the time of discharge is engaged by a rack, thereby actuating the rotation of the mat that discharges the object into underlying collecting devices.

Sorting apparatuses in which the objects to be sorted are laid down onto a transportation plane consisting of a rotating mat mounted on a dolly that is dragged along a fixed path are already known.

When the dolly passes in correspondence with the collection devices that are to receive the object, the electronic apparatuses that control the plant actuate the rotating mat to carry out the discharge operation.

One of these sorting machines is known from the patent application MI A 2213 dated Jun. 8, 1991, of the same Applicant.

In some of these sorting machines the collection devices are arranged to the side of the dolly path and the rotating mat moves consequently in a direction that is orthogonal to the advancement direction.

This system has however the drawback of being quite bulky and, most of all, of requiring an extremely heavy management of the machine because both the position of the object on the transportation plane and the discharge speed are to be controlled with the highest precision in order to avoid mistakes. Apparatuses in which the collection devices are arranged below the dollies are also known, said dollies being tilted at the time of discharge in order to let the object fall into an underlying container.

SUMMARY OF THE INVENTION

The present invention relates to an apparatus of this kind, but it is distinguished in that the dollies are kept in a tilted position along the whole path.

This feature provides marked simplifications in the management of the machine because, in order to put the mat in rotation at the precisely right moment, even mechanical means can be provided, said mechanical means being easily implemented and working reliably.

BRIEF DESCRIPTION OF THE DRAWINGS

The present invention will now be described in detail in a merely examplarily, non-limiting way with reference to the enclosed figures, in which:

FIG. 4 is a partial side view of a rail on which the dollies roll;

FIG. 5 is a partial sectional view of one of the discharged mats.

DESCRIPTION OF THE PREFERRED EMBODIMENT

Figure 1:
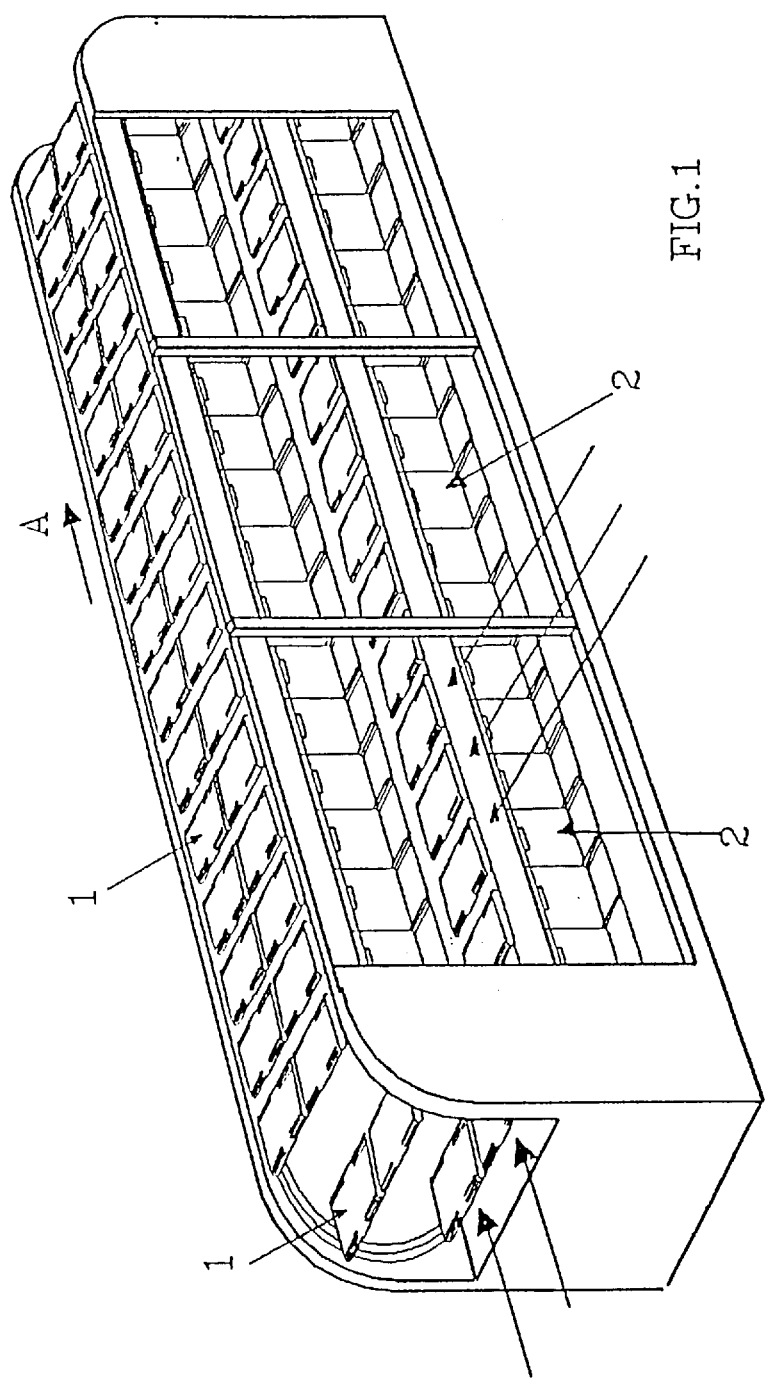
FIG. 1 is a perspective schematic view of a sorting apparatus according to the invention.

The apparatus is preferably, but not necessarily, of the closed circuit type that develops along a vertical plane with an outward path and a return path, said paths being interconnected by curved tracts and exhibiting for example the pattern shown in FIG. 1.

Figure 2:
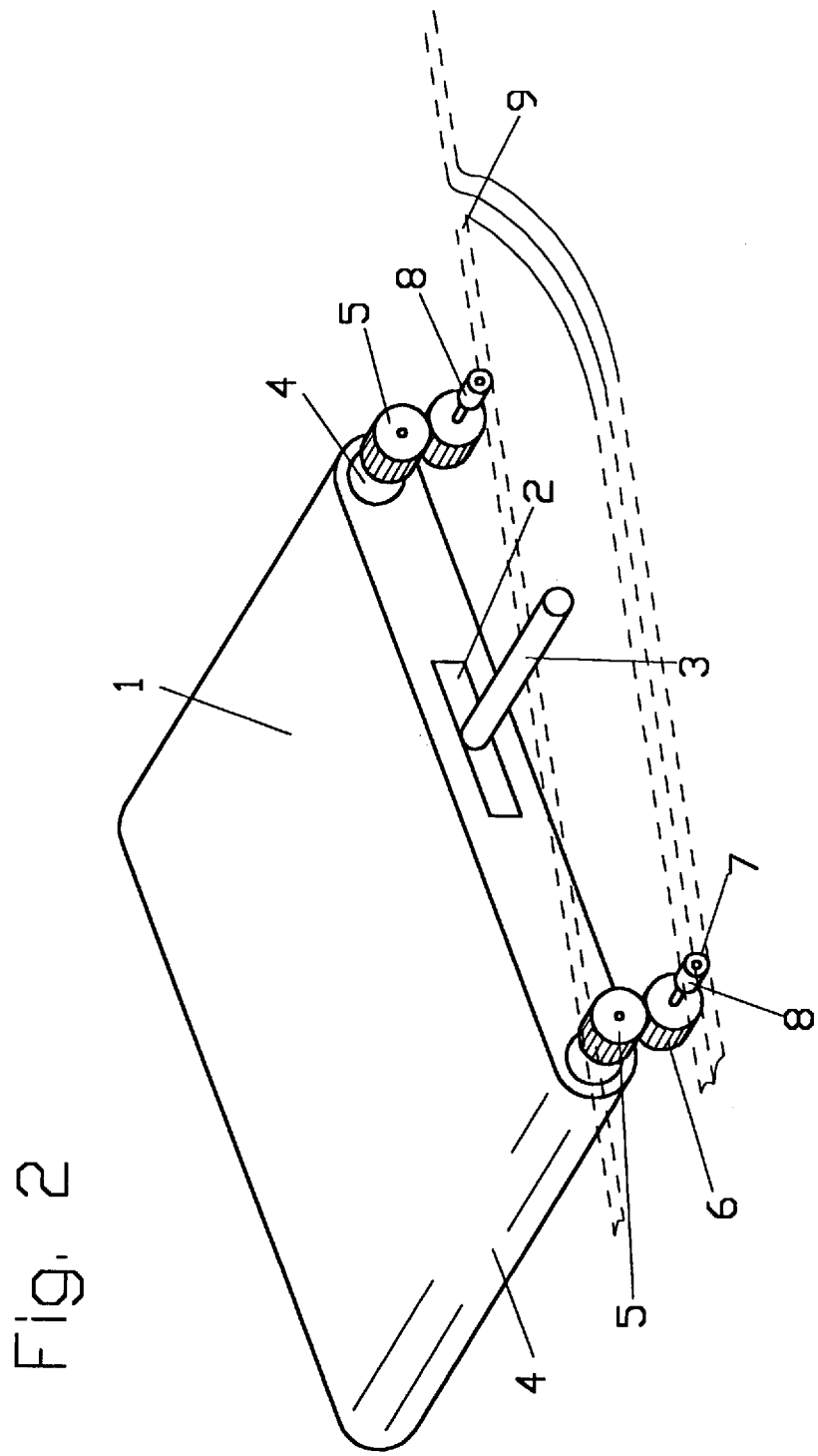
FIG. 2 is a perspective view of a dolly in a sorting apparatus according to the invention.

The path consists of rails or guides along which by means of chains or another known system a plurality of dollies of the kind shown in FIG. 2 are dragged, each dolly being provided with a rotating mat, shown in FIG. 1, that forms the transportation and discharge plane for the objects.

The dolly comprises a framework 2 that is provided with pins or arms 3 which in turn are connected to chains (not shown) that drag the dollies, idle rollers 4 supporting the mat 1 being mounted on said framework 2.

The pins 3 are hinged to the chains, thereby allowing the dolly to rotate around the axis of the same.

On the shafts of rollers 4 the same number of gear wheels 5 are fit, said gear wheels 5 matching in turn with gear wheels 6 that are mounted on pins 7 on which also idle rollers 8 or the like are mounted.

The rollers 8 lean on the guides or rails that form the path, one of which is illustrated in the figure, generally indicated with numeral 9.

This guide, that can be seen better in FIG. 4, has an upper wing 10 that forms a support or roll plane for rollers 8 and a groove or guide 11, approximately at half height, that runs in parallel with wing 10, at a short distance therefrom.

The guide 11 has, at the beginning of the path, a first length 12 immediately below wing 10 that thereafter is bent downwards and continues at a lower height for the rest of the path.

Guide 11 also has a linking tract 13 that is opened towards the upper part of the guide.

At the opposite end, guide 11 is again bent upwards and goes on with a length 15 at the same level as the beginning length 12.

Figure 3:
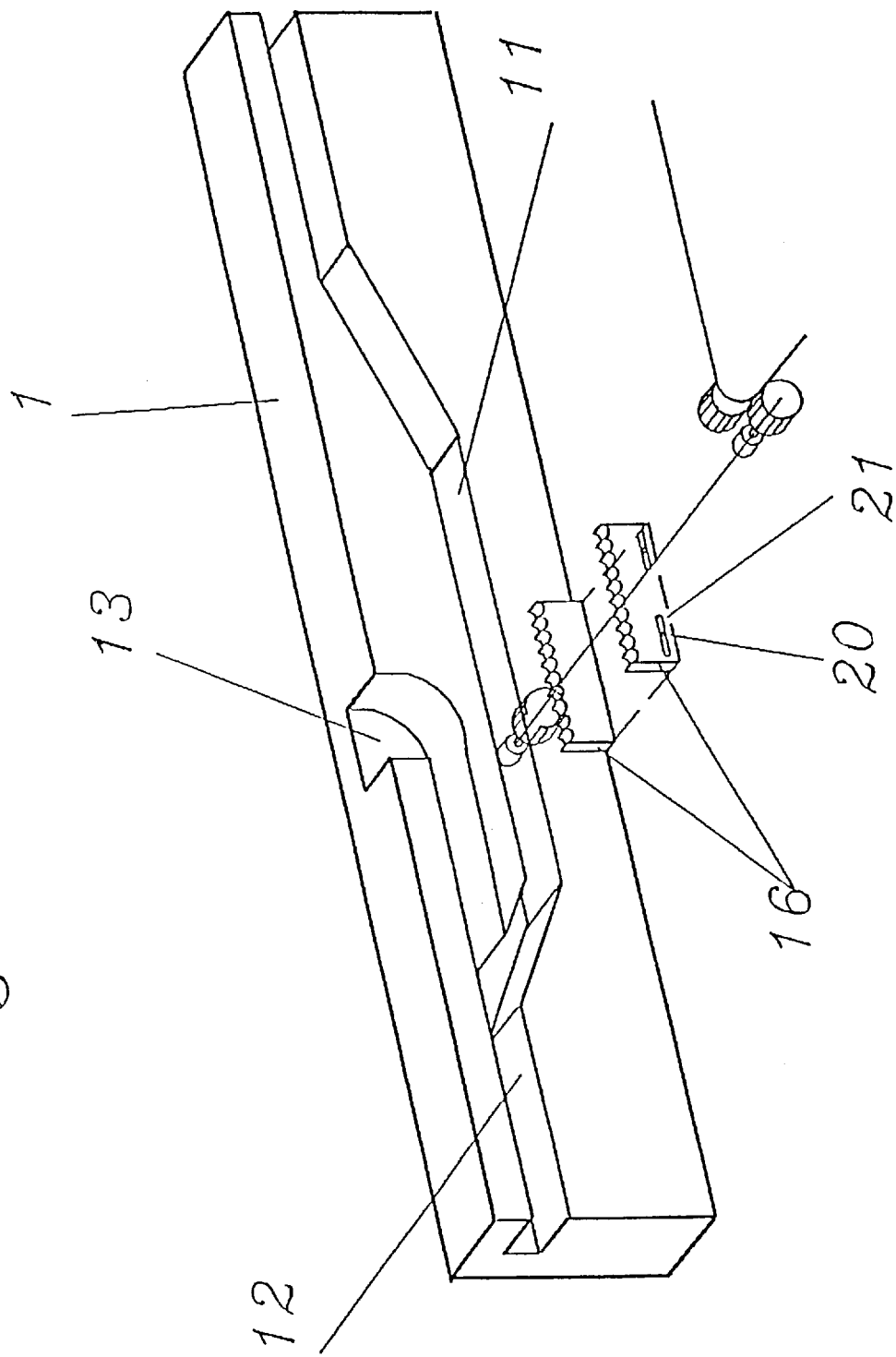
FIG. 3 illustrates a detail of the actuating devices for mat discharge.

Under guide 11, in correspondence with each of the collection devices, as many racks 16 are arranged, only one of which is visible in figure, said racks being subject to the action of pistons 17 that move them from a retracted or disengagement position to a position in which they meddle with the path of the gear wheels 6 that, upon advancement of the dolly, engage in the toothing of the rack and are caused to rotate. In FIG. 3 both of these positions of rack 16 are illustrated.

The mats I (see FIG. 5) consists of a flexible material belt to which a pair of containment tabs 18 are welded, said containment tabs preventing possible transported objects from slipping off the mat in advance of the discharge time.

The tabs 18 form an enlargement 19 that protrudes a short length from the lower or inner surface of the mat and are arranged in such a way that in the resting position, as shown in FIG. 5, they are closed to a vertical plane comprising the axes A—A of rollers 4, but displaced a short distance inwards.

The length of belt 1 is such that it is always sufficiently taut, thereby applying a pulling force between the rollers.

Owing to this pattern, when the belt stops in a different position from that shown in figure, the enlargement 19 causes the belt of the support rollers to be driven away, thereby causing it to be elastically stretched for a short distance.

This builds up a greater tension in belt 1 which acts by causing a light rotation of the mat to bring it to the resting position shown, in which the enlargement 19 of the tabs no longer engages the surfaces of rollers 4.

The apparatus works as follows:

The dollies come from the introduction and loading area for the objects to be sorted along the guide part 12 (position I of FIG. 4).

Each dolly is provided with three support points, said support points consisting of the rollers that roll along the guide and of the pin 3 that restrains them to the dragging chains.

The front roller passes the entrance of the lower guide length 11 while the dolly is kept in an horizontal position, as it is prevented from rotating around pin 3 by the walls of guide 12 that engage the back roller 7.

When this other roller comes to the entrance of the lower guide part 11, the front roller begins the ascending length 13, thereby tilting the dolly that rotates around pin 3 (position II), said dolly reaching then the transportation position 3, said position being maintained along the whole straight path length, with the front roller leaning on wing 10 and the lower one rolling along guide 12.

During this phase, the tabs 18 prevent the object on mat 3 from slipping off due to the gradient thereof.

Upon discharge, the piston 17 is actuated, which moves rack 16 to bring it in correspondence with the path of the gear wheels 6.

Said gear wheels, in their advancement, engage the toothing of the rack and are caused to rotate, thereby transmitting their motion to roller 4 and mat 1.

The diameter of the gear wheel 6 will determine, as a function of the dolly speed, the mat discharge speed.

Rack 16 is preferably mounted onto the related support with the possibility of moving a short length along its own axes in contrast to the elastic means.

For example, rack 16 can comprise slots 20 in which as many pins 21 are inserted, said pins being solidly connected to the support means (not shown), and will have the possibility of moving relative to said pins 20 in contrast to springs or the like.

This will allow the rack to better take up the impact with the gear wheel 6.

The length of the rack is such that mat 1 is caused to make a rotation that is sufficient to bring it to the starting position, with tabs 18 aligned, as shown in FIG. 4.

Should for any reason the belt stop in a slightly biased position, for example in the position shown with a broken line in FIG. 5, the mat tension due to the greater extension caused by the presence of enlargement 19 leaning on roller 4 is enough to bring it again to the provided position, centering it again on the roller.

A person skilled in the art can devise many changes and variations that are all to be considered as being included within the scope of the present invention.

We claim:

1. A sorting machine comprising a plurality of dollies, each dolly provided with a rotating mat forming a transportation and discharging plane for objects, said dollies being dragged along a fixed path, the sorting machine comprising: means for keeping the dollies in a tilted position while they are dragged along the fixed path, gear wheels on an outside of each of said dollies, each mat having a support roller shaft, said gear wheels being fit on said mat support roller shafts, racks being provided level with object discharge areas for the objects, said racks being mounted on movable supports that are suited to bring them from a position in which they do not meddle with the fixed path to a position in which they engage said gear wheels, thereby causing the mat to rotate.

2. A sorting machine as claimed in claim 1, wherein each dolly is hinged at a central point and is provided with a pair of idle wheels, said idle wheels rolling along a guide that comprises two superposed lengths, each mat having a front and a back roller, means suited to direct the front roller toward one of these superposed lengths and the back roller toward the other superposed length, so as to keep the dollies in a tilted position during transportation.

3. A sorting machine as claimed in claim 2, further including a double guide at a starting position having a common length that is limited upwardly and downwardly by parallel walls, said guide presenting an entrance directed toward a lower part of the path, and an ascending length directed toward an upper part of the path, the distance between said entrance and said ascending length being the same as the distance between the two idle rollers on each dolly, each dolly being hinged to a support pin that is arranged in a central position between said rollers.

4. A sorting machine as claimed in claim 1, in which said racks are mounted on said movable supports with the possibility of the movable supports being elastically stretched for a short distance.

5. A sorting machine comprising a plurality of dollies, each dolly provided with a rotating mat forming a transportation and discharging plane for objects, said dollies being dragged along a fixed path, the sorting machine comprising means for keeping the dollies in a tilted position while they are dragged along the fixed path, said mats have pairs of rollers and pairs of wings that form front walls, said front walls being suited to prevent the transported objects from slipping off the mat, said wings presenting in a lower part thereof, a protruding part that is suited to cause the mat to be elastically stretched a short length when it leans onto the rollers thereof, said pairs of wings being arranged level to each roller, slightly offset so that said protruding parts do not engage the roller when the mat is at rest.

6. A sorting machine as claimed in claim 5, wherein each dolly is hinged at a central point and is provided with a pair of idle wheels, said idle wheels rolling along a guide that comprises two superposed lengths, each mat having a front and a back roller, means suited to direct the front roller toward one of these superposed lengths and the back roller toward the other superposed length, so as to keep the dollies in a tilted position during transportation.

7. A sorting machine as claimed in claim 6, further including a double guide at a starting position having a common length that is limited upwardly and downwardly by parallel walls, said guide presenting an entrance directed toward a lower part of the path, and an ascending length directed toward an upper part of the path, the distance between said entrance and said ascending length being the same as the distance between the two idle rollers on each dolly, each dolly being hinged to a support pin that is arranged in a central position between said rollers.

\* \* \* \* \*